United States Patent
Wu

(10) Patent No.: US 12,062,909 B2
(45) Date of Patent: Aug. 13, 2024

(54) METHOD AND APPARATUS FOR CAPACITOR DEMAND EVALUATION IN POWER DISTRIBUTION NETWORK

(71) Applicant: CHANGXIN MEMORY TECHNOLOGIES, INC., Hefei (CN)

(72) Inventor: Zengquan Wu, Hefei (CN)

(73) Assignee: Changxin Memory Technologies, Inc., Anhul (CN)

( * ) Notice: Subject to any disclaimer, the term of this patent is extended or adjusted under 35 U.S.C. 154(b) by 218 days.

(21) Appl. No.: 17/954,610

(22) Filed: Sep. 28, 2022

(65) Prior Publication Data

US 2023/0018644 A1 Jan. 19, 2023

Related U.S. Application Data

(63) Continuation of application No. PCT/CN2022/096826, filed on Jun. 2, 2022.

(30) Foreign Application Priority Data

May 24, 2022 (CN) .......................... 202210567869.9

(51) Int. Cl.
*H02J 1/00* (2006.01)
*H02M 1/00* (2006.01)
*H02M 3/07* (2006.01)

(52) U.S. Cl.
CPC ............. *H02J 1/001* (2020.01); *H02M 1/008* (2021.05); *H02M 3/07* (2013.01)

(58) Field of Classification Search
CPC ........... H02J 1/001; H02M 1/008; H02M 3/07
USPC ......................................................... 323/282
See application file for complete search history.

(56) References Cited

U.S. PATENT DOCUMENTS

| | | | |
|---|---|---|---|
| 2013/0015821 A1* | 1/2013 | Kim | H02J 7/0019 320/128 |
| 2013/0090873 A1* | 4/2013 | Lundstrum | H03K 17/962 700/286 |
| 2018/0076646 A1* | 3/2018 | Lindsay | H02H 9/00 |
| 2020/0036308 A1* | 1/2020 | Pant | H02M 7/219 |

* cited by examiner

*Primary Examiner* — Yemane Mehari
(74) *Attorney, Agent, or Firm* — Cooper Legal Group, LLC

(57) ABSTRACT

Embodiments provide a method and apparatus for capacitor demand evaluation in a PDN that includes at least one power bus provided with multiple nodes. The multiple nodes are distributed at different positions of the power bus. Each of the multiple nodes is connected to multiple capacitors connected in parallel. Each of the multiple capacitors is provided with a respective one of control switches. The method includes: Multiple adjustment operations are performed. Upon accomplishment of each of the multiple adjustment operations, a respective IR drop of the power bus and a respective running speed of the load circuit are detected; for each of different nodes on the power bus, an ideal capacitance of the node is determined according to the IR drops of the power bus and running speeds of the load circuit detected through the multiple adjustment operations.

20 Claims, 5 Drawing Sheets

| Multiple adjustment operations are performed. Upon accomplishment of each of the multiple adjustment operations, an IR drop of a power bus and a running speed of a load circuit are detected. Here, each of the multiple adjustment operations is used for adjusting a conducting state of at least one of capacitors connected to at least one of multiple nodes to adjust an equivalent capacitance of the multiple capacitors connected to the at least one of the multiple nodes | ← 301 |

↓

| For each of different nodes on the power bus, an ideal capacitance of the node is determined according to the IR drops of the power bus and the running speeds of the load circuit detected through the multiple adjustment operations | ← 302 |

FIG. 3

METHOD AND APPARATUS FOR CAPACITOR DEMAND EVALUATION IN POWER DISTRIBUTION NETWORK

CROSS REFERENCE TO RELATED APPLICATIONS

This is a continuation of International Application No. PCT/CN2022/096826, filed on Jun. 2, 2022, which claims priority to Chinese Patent Application No. 202210567869.9, filed on May 24, 2022, and entitled "Method and Apparatus for Capacitor Demand Evaluation in Power Distribution Network". The contents of International Application No. PCT/CN2022/096826 and Chinese Patent Application No. 202210567869.9 are hereby incorporated by reference in their entireties.

TECHNICAL FIELD

Embodiments of the present disclosure relate to the technical field of semiconductor, in particular to a method and apparatus for capacitor demand evaluation in a Power Distribution Network (PDN).

BACKGROUND

With the development of integrated circuit technology, PDN is becoming more and more important. PDN is a physical path to deliver power from power supply to load. The current flows from the power supply side to the load side through the PDN, and then flows back to the power supply side from the load side through the PDN.

IR Drop refers to a phenomenon of voltage drop of the power bus in the PDN. The common influence of IR drop is that the running speed of the load will be reduced. Therefore, how to effectively reduce the IR drop of the power bus is an urgent problem to be solved at present.

SUMMARY

According to a first aspect, embodiments of the present disclosure provide a method for capacitor demand evaluation in a PDN. The PDN includes at least one power bus provided with multiple nodes. The multiple nodes are distributed at different positions of the power bus. Each of the multiple nodes is connected to multiple capacitors connected in parallel. Each of the multiple capacitors is provided with a respective one of control switches. The power bus is used for supplying power to a load circuit. The method includes the following operations.

Multiple adjustment operations are performed. Upon accomplishment of each of the multiple adjustment operations, a respective IR drop of the power bus and a respective running speed of the load circuit are detected. Here each of the multiple adjustment operations is used for adjusting a conducting state of at least one of capacitors connected to at least one of the multiple nodes through the control switches to adjust an equivalent capacitance of the multiple capacitors connected to the at least one of the multiple nodes.

For each of different nodes on the power bus, an ideal capacitance of the node is determined according to the IR drops of the power bus and running speeds of the load circuit detected through the multiple adjustment operations.

According to a second aspect, embodiments of the present disclosure provide an apparatus for capacitor demand evaluation in a PDN. The PDN includes at least one power bus provided with multiple nodes. The multiple nodes are distributed at different positions of the power bus. Each of the multiple nodes is connected to multiple capacitors connected in parallel. Each of the multiple capacitors is provided with a respective one of control switches. The power bus is used for supplying power to a load circuit. The apparatus includes a test circuit and an evaluation circuit.

The test circuit is configured to perform multiple adjustment operations and detect a respective IR drop of the power bus and a respective running speed of the load circuit upon accomplishment of each of the multiple adjustment operations. Herein each of the multiple adjustment operations is used for adjusting a conducting state of at least one of capacitors connected to at least one of the multiple nodes through the control switches to adjust an equivalent capacitance of the multiple capacitors connected to the at least one of the multiple nodes.

The evaluation circuit is configured to determine an ideal capacitance of the node according to the IR drops of the power bus and running speeds of the load circuit detected through the multiple adjustment operations for each of different nodes on the power bus.

According to a third aspect, embodiments of the present disclosure provide an electronic device, which includes at least one processor and a memory.

The memory stores computer executable instructions.

The at least one process is configured to execute the computer executable instructions to perform the method for capacitor demand evaluation in a PDN provided in the first aspect.

BRIEF DESCRIPTION OF THE DRAWINGS

FIG. 3 is a diagram of steps of a method for capacitor demand evaluation in the PDN according to an embodiment of the present disclosure.

DETAILED DESCRIPTION

Figure 1:
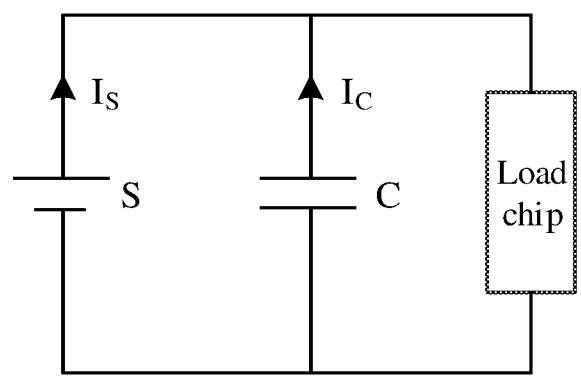
FIG. 1 is a structural diagram of a PDN according to an embodiment of the present disclosure.

In order to make the objectives, technical solutions and advantages of the embodiments of the present disclosure more clear, the technical solutions in the embodiments of the present disclosure will be clearly and completely described below in combination with the accompanying drawings in the embodiments of the present disclosure. Obviously, the described embodiments are part of the embodiments of the present disclosure, not all of the embodiments. All other embodiments obtained by those of ordinary skill in the art based on the embodiments of the present disclosure without making creative effort should fall within the scope of protection of the present disclosure. Furthermore, although the present disclosure is presented by using one or more exemplary embodiments, it should be understood that each of the aspects of these embodiments may individually form a complete embodiment.

It should be noted that the brief description of terms in the present disclosure is only for the convenience of understanding the embodiments described below and is not intended to limit the embodiments of the present disclosure. Unless otherwise specified, these terms should be understood in their common and ordinary meanings.

The terms "first", "second" and the like in the description, the claims and the above drawings of the present disclosure are used to distinguish similar or congener objects or entities and are not necessarily meant to define a particular order or priority unless otherwise noted. It should be understood that the terms so used are interchangeable where appropriate and can be implemented, for example, in order other than those given in the illustration or description of the embodiments of the present disclosure.

Further, the terms "including" and "having" and any variations thereof are intended to express covered but not exclusive inclusion. For example, products or devices that contain a series of components need not be limited to those clearly listed, but may include other components that are not clearly listed or are inherent to such products or devices.

The term "module" used in embodiments of the present disclosure refers to any known or later developed hardware, software, firmware, artificial intelligence, fuzzy logic, or combination of hardware or/and software code, and is capable of performing functions associated with the element.

Embodiments of the present disclosure can be applied to the semiconductor field, for example, in a PDN design process.

Here, PDN can provide a stable voltage for the load, quickly respond to change of the load current and reduce the switching noise.

Currently, in the research and development of electronic products, with the increasing frequency of master control, the importance of PDN is self-evident. Taking the logic gate circuit as an example, if the PDN is not well designed, the power supply at the logic gate cannot reach the supply voltage. When the logic gate is enabled, the time for high-level establishment is longer and the holding time is shorter, which may cause the processor to fail to operate at the current frequency, thereby resulting in frequency degradation and even logic error.

General semiconductor devices have certain requirements on operating power supply, which are usually represented by three parameters (i.e. limit voltage, recommended operating voltage and power noise).

Limit supply voltage refers to the limit of the supply voltage that the supply pin of a semiconductor device can withstand. The supply voltage of the semiconductor device cannot exceed the required range of the parameter; otherwise permanent damage may be caused to the semiconductor device. The function of the semiconductor device cannot be guaranteed without the range. The long-term stability of the semiconductor device will be affected if the semiconductor device operates at the limit value of the parameter for a certain time.

Recommended operating voltage refers to a voltage range in which the voltage of the supply pin of the semiconductor device should satisfy in order to make the semiconductor device operate normally and reliably. The recommended operating voltage is usually represented by "V±x %". Herein V is the typical operating voltage of the supply pin of the semiconductor device; x % is an allowable voltage fluctuation range, and x is usually 5 or 3.

Power noise refers to an allowable ripple noise on the voltage of the supply pin of semiconductor device in order to make the semiconductor device operate normally and reliably. The power noise is usually represented by its peak-to-peak value.

Causes of the power noise may include the noise ripple of the power supply per se. the load adjustment rate and the IR drop caused by change of the power supply in the power path. Here, the common influence of IR drop is to reduce the running speed of load circuit.

In order to guarantee the running speed of the load circuit, in some solutions, the IR drop of the power bus in PDN is reduced by setting capacitors on the power bus.

Here, a capacitor consists of two polar plates that are closed to each other and sandwiched with a non-conductive insulating dielectric. When a voltage is applied between the two polar plates of the capacitor, the capacitor stores electric charges. The capacitance of the capacitor is numerically equal to the ratio of the amount of charges on one polar plate to the voltage between two polar plates. When the voltage between the two polar plates changes, a current flows between the two plates. In other words, the capacitor can provide a current outward at the cost of a voltage change. As long as the capacitance of the capacitor is large enough, a small change of voltage can provide a current large enough.

For a better understanding of the embodiments of the present disclosure, reference can be made to FIG. 1, which is a structural diagram of a PDN according to an embodiment of the present disclosure.

As illustrated in FIG. 1, when a current of a load chip is constant, the current is provided by a regulated power supply S (i.e. $I_S$ in FIG. 1). At this time, a voltage across capacitor C is equal to a voltage across the load chip, and a current $I_C$ flowing through the capacitor C is 0.

When the transient current of the load chip changes, enough current must be provided for the load chip in a very short time. However, the regulated power supply S cannot quickly act to change of the load current. In other words, the current $I_S$ cannot immediately meet requirements of the load transient current, and the voltage across the load chip is thus reduced. However, since the voltage across the capacitor C is the same as the voltage across the load chip, when the voltage across the load chip is decreased, the voltage across the capacitor C is also changed. For the capacitor C, the voltage change inevitably generates a current, so the capacitor C discharges to the load chip, and the current $I_C$ is no longer 0. At this time, the current $I_S$ and the current $I_C$ are provided to the load chip at the same time.

It can be concluded from FIG. 1 that the capacitor in PDN can provide a transient current for the load chip to hinder a transient voltage change, thereby reducing the IR drop of the power bus to a certain extent.

For the capacitor, it should be understood that when the voltage between the two polar plates is changed, a current flows between the two polar plates, which can be represented by $$I_c = C\frac{dV}{dt}.$$

Here, C is a capacitance of the capacitor in farad (F), and dV indicates a change amount of the voltage across the capacitor within a period dt.

It can be seen from the above analysis that the discharge current $I_C$ of the capacitor is related to the capacitance C of the capacitor. In other words, the capacitance of the capacitor may affect the reduction degree of the IR drop of the power bus. However, how to evaluate the capacitance of the capacitor of the power bus and where the capacitor should be set on the power bus to effectively reduce the IR drop of the power bus is an urgent technical problem to be solved at present.

Facing the above technical problems, embodiments of the present disclosure provide a method for capacitor demand evaluation in the PDN. Each of multiple nodes on the power buses in the PDN is connected to multiple capacitors parallel to each other. Each of the multiple capacitors is provided with a respective one of control switches. Equivalent capacitance of the multiple capacitors connected to each of the multiple nodes can be adjusted several times through the control switches. For each of different nodes on the power buses, an ideal capacitance of the node can be determined according to the IR drops of the power bus and the running speeds of the load circuit detected through the multiple adjustment operations. For specific embodiments, reference can be made to the following contents.

Some embodiments of the present disclosure provide a novel PDN, which includes at least one power bus provided with the multiple nodes. The multiple nodes are distributed at different positions of the power bus. Each of the multiple nodes is connected to the multiple capacitors connected in parallel. Each of the multiple capacitors is provided with a respective one of control switches. The power bus is used for supplying power to the load circuit.

Figure 2:
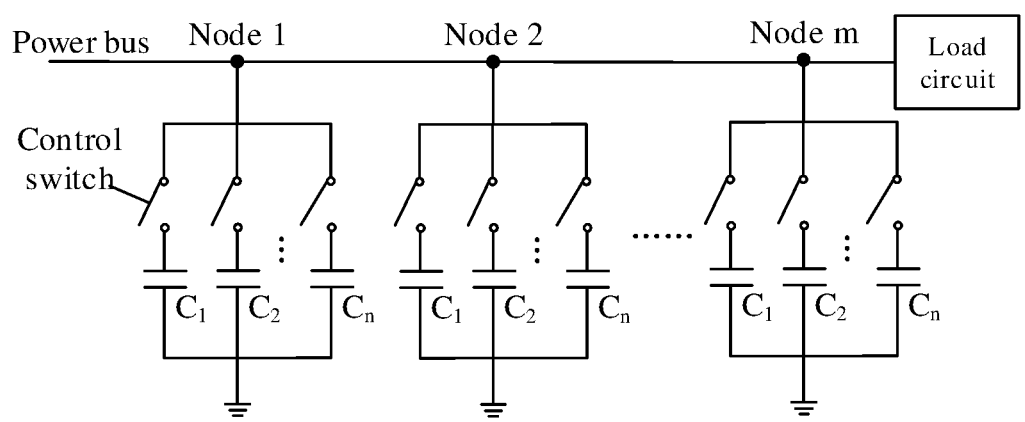
FIG. 2 is a structural diagram of a novel PDN according to an embodiment of the present disclosure.

In order to better understand the embodiments of the present disclosure, reference is made to FIG. 2, which is a structural diagram of a novel PDN according to an embodiment of the present disclosure.

Exemplary, The PDN illustrated in FIG. 2 includes a power bus provided with the M nodes (i.e. node 1, node 2, . . . , node M). The M nodes are distributed at different positions of the power bus. Each node is connected to N capacitors connected in parallel (i.e. $C_1, C_2, \ldots, C_n$). The numbers of the parallel capacitors connected to different nodes can vary. Each capacitor is provided with a respective one of control switches. The power bus is used for supplying power to the load circuit.

In some embodiments, both m and n are integers greater than or equal to 2.

In some embodiments, the capacitances of n capacitors connected to the same node can be the same or different, and the capacitances of n capacitors connected to different nodes can be the same or different.

Reference is made to FIG. 3, which is a diagram of steps of a method for capacitor demand evaluation in the PDN according to an embodiment of the present disclosure. In some embodiments of the present disclosure, the method for capacitor demand evaluation in the PDN includes the following operations.

At block S301, multiple adjustment operations are performed. Upon accomplishment of each of the multiple adjustment operations, an IR drop of a power bus and a running speed of a load circuit are detected. Here, each of the multiple adjustment operations is used for adjusting a conducting state of at least one of capacitors connected to at least one of multiple nodes to adjust an equivalent capacitance of the multiple capacitors connected to the at least one of the multiple nodes.

In some embodiments, for a certain node, the control switches of multiple parallel capacitors connected to the node can be adjusted according to multiple adjustment schemes, and the IR drop of the power bus and the running speed of the load circuit can be detected through each adjustment operation, so that the influence of the capacitances of the multiple capacitors set at the node on the IR drop of the power bus and the running speed of the load circuit can be evaluated.

In some embodiments, it is assumed that there are three capacitors (i.e. $C_1, C_2, C_3$) connected in parallel at node 1. Exemplarily, it is assumed that $C_1=C_2=C_3=10$ nF. In a feasible embodiment, the following three adjustment operations may be performed in turn.

Adjustment operation 1-1: the control switch of capacitor $C_1$ is adjusted to be in a closed state. The control switches of capacitors $C_2$ and $C_3$ are adjusted to be in an open state.

Adjustment operation 1-2: The control switches of capacitors C1 and $C_2$ are adjusted to be in a closed state. The control switch of capacitor $C_3$ is adjusted to be in an open state.

Adjustment operation 1-3: The control switches of capacitors $C_1$, $C_2$ and $C_3$ are adjusted to be in a closed state.

It can be understood that since the capacitors $C_1$, $C_2$ and $C_3$ are connected in parallel, when the adjustment operation 1-1 is completed, the equivalent capacitance of node 1 is 10 nF. When the adjustment operation 1-2 is completed, the equivalent capacitance of node 1 is 20 nF. When the adjustment operation 1-3 is completed, the equivalent capacitance of node 1 is 30 nF.

In some embodiments, it is assumed that there are three capacitors (i.e. $C_1, C_2, C_3$) connected in parallel at node 1. Exemplarily, it is assumed that $C_1=10$ nF, $C_2=20$ nF and $C_3=30$ nF. In a feasible embodiment, the following three adjustment operations may be performed in turn.

Adjustment operation 2-1: The control switch of capacitor $C_1$ is adjusted to be in a closed state. The control switches of capacitors $C_2$ and $C_3$ are adjusted to be in an open state.

Adjustment operation 2-2: The control switch of capacitor $C_2$ is adjusted to be in a closed state. The control switches of capacitors $C_1$ and $C_3$ are adjusted to be in an open state.

Adjustment operation 2-3: The control switch of capacitor $C_3$ is adjusted to be in a closed state. The control switches of capacitors $C_1$ and $C_2$ are adjusted to be in an open state.

It can be understood that since the capacitors $C_1$, $C_2$ and $C_3$ are connected in parallel, when the adjustment operation 2-1 is completed, the equivalent capacitance of node 1 is 10 nF. When the adjustment operation 2-2 is completed, the equivalent capacitance of node 1 is 20 nF. When the adjustment operation 2-3 is completed, the equivalent capacitance of node 1 is 30 nF.

In some embodiments, according to the IR drop of the power bus and the running speed of the load circuit detected through each of the multiple adjustment operations, the change of the IR drop of the power bus and the running speed of the load circuit when the node 1 is connected to capacitors of three different capacitances (i.e. 10 nF, 20 nF, 30 nF) respectively can be determined.

In some embodiments, the control switches of capacitors connected in parallel at other nodes can be adjusted for multiple times by referring to the adjustment operations performed on node 1. The IR drop of the power bus and the running speed of the load circuit are detected when each adjustment operation is completed, so as to evaluate the influence on the IR drop of the power bus and the running speed of the load circuit when capacitors with the same capacitance are set at different nodes.

At block S302, for each of different nodes on the power bus, an ideal capacitance of the node is determined according to the IR drops of the power bus and the running speeds of the load circuit detected through the multiple adjustment operations.

In some embodiments, ideal capacitances of the capacitors on the power bus and the nodes where the capacitors are located can be determined according to the IR drops of the power bus and the running speeds of the load circuit detected through the multiple adjustment operations.

Exemplarily, if the detected IR drop of the power bus and the running speed of the load circuit can reach an ideal state when the equivalent capacitance of the above-mentioned node 1 is adjusted to be X (nF), the ideal capacitance of the node 1 on the power bus can be determined to be X (nF).

It should be noted that for the ideal capacitance setting of the power bus, different nodes are set with respective equivalent capacitances not equal to 0. For example, when the equivalent capacitance of the node 1 is X and the equivalent capacitance of the node 2 is Y, the IR drop of the power bus and the running speed of the load circuit can reach the ideal state.

Embodiments of the present disclosure provide a method for capacitor demand evaluation in the PDN. Each of multiple nodes of the power buses of the PDN is connected to multiple capacitors connected in parallel. Each of the multiple capacitors is provided with a respective one of control switches. Equivalent capacitance of the multiple capacitors connected to each of the multiple nodes can be adjusted for several times through the control switches. For each of different nodes on the power bus, an ideal capacitance of the node can be determined according to the IR drops of the power bus and the running speeds of the load circuit detected through the multiple adjustment operations. Embodiments of the present disclosure can accurately evaluate ideal capacitances and positions of capacitors required on the power buses in the PDN, thereby effectively reducing the IR drop of the power bus and guaranteeing the running speed of the load circuit.

Based on the contents illustrated in the above embodiments, in some embodiments of the present disclosure, multiple first adjustment schemes can be determined in advance before performing the multiple adjustment operations. Herein, at least one of the nodes has different target capacitances among different ones of the first adjustment schemes.

In performing the multiple adjustment operations, the multiple first adjustment schemes are traversed. For each of the multiple first adjustment schemes being traversed, a target node to be adjusted and a target capacitance of the target node are determined, and control switches of capacitors connected to the target node are adjusted to make an equivalent capacitance of the capacitors connected to the target node to be equal to the target capacitance.

In some embodiments, it is assumed that the power bus includes node 1 and node 2, and that each of the node 1 and the node 2 is connected to three capacitors $C_1$, $C_2$, $C_3$ connected in parallel. Exemplarily, it is assumed that $C_1$=10 nF, $C_2$=20 nF, and $C_3$=30 nF. In a feasible embodiment, the multiple first adjustment schemes described above may include, but not be limited to, the following operations.

The equivalent capacitance of the multiple capacitors connected to the node 1 is adjusted to be XnF, and the equivalent capacitance of the multiple capacitors connected to the node 2 is adjusted to be 0 nF.

The equivalent capacitance of the multiple capacitors connected to the node 1 is adjusted to be 0 nF, and the equivalent capacitance of the multiple capacitors connected to the node 2 is adjusted to be YnF.

The equivalent capacitance of the multiple capacitors connected to the node 1 is adjusted to be XnF, and the equivalent capacitance of the multiple capacitors connected to the node 2 is adjusted to be YnF.

Herein the values of X and Y may include 10, 20, 30, 40, 50 and 60.

According to the method for capacitor demand evaluation in the PDN provided by the embodiments of the present disclosure, the multiple first adjustment schemes can be determined in advance. The ideal capacitances and positions of capacitors needed on the power bus in the PDN can be accurately evaluated according to the IR drops of the power buses and the running speed of the load circuit detected through the adjustment schemes, thereby effectively reducing the IR drop of the power bus and guaranteeing the running speed of the load circuit.

Based on the contents described in the above embodiments, in some embodiments of the present disclosure, conducting states of the capacitors connected to the at least one of the multiple nodes can be adjusted according to a second adjustment scheme. The second adjustment scheme can be updated according to the IR drop of the power bus and the running speed of the load circuit detected through the second adjustment scheme. The conducting states of the capacitors connected to the at least one of the multiple nodes are adjusted according to the updated second adjustment scheme until the IR drop of the power bus and the running speed of the load circuit satisfy a preset condition.

In some embodiments, the second adjustment scheme may also be updated based on the detection result of the previous second adjustment scheme until a capacitor setting scheme which can achieve a detection result satisfying the preset condition and is closest to the preset condition is found, so that the preset condition can be satisfied with a smaller capacitance, thereby reducing the layout area of the capacitors.

In some embodiments, the conducting states of the capacitors connected to at least one node may first be adjusted according to a preset adjustment scheme A, so that the equivalent capacitance of the capacitors conducted on the power bus is equal to a (nf). The conducting state of the capacitors connected to at least one node is then adjusted according to a preset adjustment scheme B, so that the equivalent capacitance of the capacitors on the power bus is equal to b (nf). Herein a<b. It is assumed that the IR drop of the power bus and the running speed of the load circuit cannot satisfy the preset condition upon the adjustment scheme A, and the IR drop of the power bus and the running speed of the load circuit can satisfy the preset condition upon the adjustment scheme B; however, in a practical application process, the adjustment scheme B is not easy to implement or requires a large layout area, and will cause a large power consumption and high cost. In this situation, an adjustment scheme C may be determined, which can make the equivalent capacitance of the capacitors on the power bus to be c (nf) by adjusting the conducting state of the capacitors connected to at least one node. Herein a<c<b.

It should be understood that upon adjustment scheme C, if it is detected that the IR drop of the power bus and the running speed of the load circuit still do not satisfy the preset condition, an adjustment scheme D can be determined until it is detected that the IR drop of the power bus and the running speed of the load circuit satisfy the preset condition.

It should be understood that turning on capacitors with the same capacitance at different positions of the power bus may have different influences on the IR drop of the power bus and the running speed of the load circuit. Therefore, when a new adjustment scheme is determined, it is possible to merely adjust the conducting state of the capacitors connected to a certain node, or the conducting state of the capacitors connected to multiple nodes can be adjusted at the same time, so as to make the IR drop of the power bus and the running speed of the load circuit satisfy the preset condition, which will be more conducive to the layout of the capacitor layout and reduce the cost and power consumption.

According to the method for capacitor demand evaluation in the PDN according to embodiments of the present disclosure, the adjustment scheme can be continuously adjusted according to the detected IR drop of the power bus and the running speed of the load circuit, until the IR drop of the power bus and the running speed of the load circuit satisfy the preset condition, so that the ideal capacitances and positions of capacitors needed on the power bus in the PDN can be accurately evaluated, thereby effectively reducing the IR drop of the power bus and guaranteeing the running speed of the load circuit.

Based on the contents described in the above embodiments, in some embodiments of the present disclosure, capacitances of the capacitors connected to the nodes of the power buses can be different from each other.

When the multiple adjustment operations are performed, each of the multiple first adjustment schemes is traversed. For each of the multiple first adjustment schemes being traversed, a target node to be adjusted and a target capacitance of the target node are determined. Herein the capacitors connected to the target node include a first capacitor, and a capacitance of the first capacitor is the target capacitance.

For the execution of first adjustment being traversed, control switch of the first capacitor is adjusted to be in a closed state, and control switches of capacitors, other than the first capacitor, connected to the target node are adjusted to be in an open state.

Based on the contents described in the above embodiments, in some embodiments of the present disclosure, capacitances of the capacitors connected to the nodes of the power buses can be different from each other, or may be partially or completely the same.

When the multiple adjustment operations are performed, each of the multiple first adjustment schemes is traversed. For each of the multiple first adjustment schemes being traversed, the target node to be adjusted and the target capacitance of the target node are determined. Herein the capacitors connected to the target node include at least two first capacitors, and a total capacitance of the at least two first capacitors is the target capacitance.

For the execution of first adjustment being traversed, control switches of the at least two capacitors are adjusted to be in a closed state, and control switches of capacitors, other than the at least two capacitors, connected to the target node are adjusted to be in an open state.

According to the method for capacitor demand evaluation in the PDN provided by the embodiments of the present disclosure, different capacitors connected to a node can be switched on by adjusting the control switches so as to adjust the equivalent capacitances of the multiple capacitors connected to the node, or the number of capacitors connected to the node that are switched on can be adjusted by adjusting the control switches so as to adjust the equivalent capacitance of the multiple capacitors connected to the nodes, which can make the adjustment mode flexible and simplify the operations, thereby effectively reducing the evaluation difficulty.

Based on the contents described in the above embodiments, it should be understood that the capacitances of the capacitors connected to the same node of the power bus are not the larger the better. On one hand, a capacitor of a larger capacitance occupies a larger area. One the other hand, when the capacitance of the capacitor is large to a certain extent, increasing the capacitance of the capacitor has little influence on the IR drop of the power bus.

In some embodiments, for each of different nodes of the power bus, a minimum equivalent capacitance of the node is determined when each of the IR drop of the power bus and the running speed of the load circuit is within a respective preset range. For each of different nodes of the power bus, the minimum equivalent capacitance of the node is taken as the ideal capacitance of the node, so as to minimize the total capacitance of the capacitors actually electrically connected to the power bus, thereby reducing the layout proportion of the capacitors.

When the capacitance of the capacitors on the power bus that are switched on is increased to a certain value, if the capacitance is continuously increased, the amplitude of variation of the IR drop and of the running speed of the load circuit will be smaller and smaller. The range in which the IR drop and the running speed of the load circuit vary slowly can be defined as the above-mentioned preset range.

In some embodiments, upon the multiple adjustment operations, the equivalent capacitances of different nodes on the power bus may also be determined based on the power noise of the power supply.

In some embodiments, the load circuit in the above embodiments may include any one of the following circuits. A data signal input and output control circuit, a clock signal input control circuit, a chip select signal input control circuit, a command and address signal input control circuit, a Row Address Strobe (RAS) signal control circuit or a Column Address Strobe (CAS) signal control circuit.

In some embodiments, multiple layouts for the same load circuit can be selected for evaluation, so as to evaluate the maximum current consumption of the load circuit. It should be understood that a layout for the load circuit having the maximum current consumption may be considered as the worst case of the layout design of the load circuit. In other words, the present disclosure is used for evaluating ideal capacitances of different nodes on the power bus when the layout is in the worst case. The equivalent capacitances of different nodes on the power bus can be designed according to the worst case of the layout, which is beneficial for leaving margin for the IR adjustment of the power bus.

In some embodiments, by selecting different load circuits, it is also possible to test the ideal capacitances of different nodes on the power bus when the power bus supplies power to the different load circuits.

In some embodiments, the influence of the IR drop on the timing of the load circuit can also be tested through the above-mentioned multiple adjustment operations. For example, the influence of IR drop on the timing of the load circuit can be evaluated according to the change of the IR drop of the power bus and the change of the running speed of the load circuit detected through the multiple adjustment operations.

In some embodiments, since the influences of the IR drops on the timings of the different load circuits may be different, different preset conditions may be set based on the influences of the IR drops on the timings of the different load circuits.

Based on the contents described in the above embodiments, embodiments of the present disclosure also provide an apparatus for capacitor demand evaluation in a PDN. The PDN includes at least one power bus provided with multiple nodes. The multiple nodes are distributed at different positions of the power bus. Each of the multiple nodes is connected to multiple capacitors connected in parallel. Each of the multiple capacitors is provided with a respective one of control switches. The power bus is used for supplying power to a load circuit. Reference can be made to the PDN of the embodiments illustrated in FIG. 2.

Figure 4:
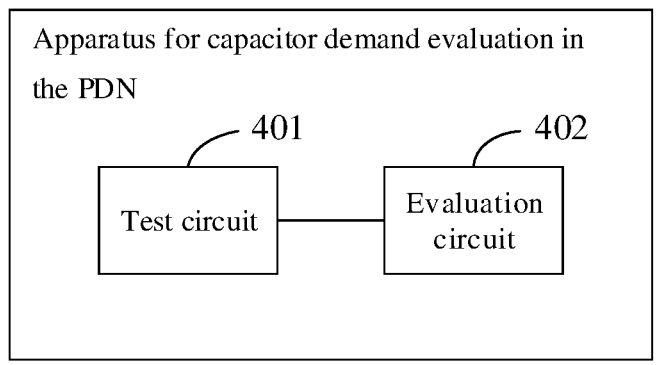
FIG. 4 is a diagram of program circuits of an apparatus for capacitor demand evaluation in the PDN according to an embodiment of the present disclosure.

As illustrated in FIG. 4, which is a diagram of an apparatus for capacitor demand evaluation in the PDN according to an embodiment of the present disclosure, the apparatus for capacitor demand evaluation in the PDN includes a test circuit 401 and an evaluation circuit 402.

The test circuit 401 is configured to perform multiple adjustment operations, and detect, upon accomplishment of each of the multiple adjustment operations, a respective IR drop of a power bus and a respective running speed of a load circuit. Herein each of the multiple adjustment operations is used for adjusting a conducting state of at least one of capacitors connected to at least one of the multiple nodes, to adjust an equivalent capacitance of the multiple capacitors connected to the at least one of the multiple nodes.

The evaluation circuit 402 is configured to, for each of different nodes on the power bus, determine an ideal capacitance of the node according to the IR drops of the power bus and running speeds of the load circuit detected through the multiple adjustment operations.

In a feasible embodiment, the test circuit 401 is configured to perform the following operations.

Multiple first adjustment schemes are determined. Herein at least one of the nodes has different target capacitances among different ones of the first adjustment schemes.

The multiple first adjustment schemes are traversed.

For each of the multiple first adjustment schemes being traversed, a target node to be adjusted and a target capacitance of the target node are determined, and control switches of capacitors connected to the target node are adjusted to make an equivalent capacitance of the capacitors connected to the target node to be equal to the target capacitance.

In a feasible embodiment, the test circuit 401 is configured to perform the following operations.

Conducting states of the capacitors connected to the at least one of the multiple nodes are adjusted according to a second adjustment scheme.

The second adjustment scheme is updated according to an IR drop of the power bus and a running speed of the load circuit detected through the second adjustment scheme.

The conducting states of the capacitors connected to the at least one of the multiple nodes are adjusted according to the updated second adjustment scheme until the IR drop of the power bus and the running speed of the load circuit satisfy a preset condition.

In a feasible embodiment, the capacitors connected to the target node may include a first capacitor, and a capacitance of the first capacitor is the target capacitance. The test circuit 401 is configured to perform the following operations.

Control switch of the first capacitor is adjusted to be in a closed state. Control switches of capacitors, other than the first capacitor, connected to the target node are adjusted to be in an open state.

In a feasible embodiment, the capacitors connected to the target node may include at least two first capacitors, and a total capacitance of the at least two first capacitors is the target capacitance. The test circuit 401 is configured to perform the following operations.

Control switches of the at least two capacitors are adjusted to be in a closed state. Control switches of capacitors, other than the at least two capacitors, connected to the target node are adjusted to be in an open state.

In one feasible embodiment, the evaluation circuit 402 is configured to perform the following operations.

For each of different nodes of the power bus, a minimum equivalent capacitances of the node is determined when each of the IR drop of the power bus and the running speed of the load circuit is within a respective preset range.

The minimum equivalent capacitance of the node is taken as the ideal capacitance of the node.

In a feasible embodiment, the load circuit includes any one of the followings.

A data signal input and output control circuit, a clock signal input control circuit, a chip select signal input control circuit, a command and address signal input control circuit, a RAS signal control circuit or a CAS signal control circuit.

In some embodiments, the apparatus for capacitor demand evaluation in the PDN can evaluate the load circuit in the worst condition. For example, IR drop and timing can be tested in the worst layout of the same load circuit, so as to evaluate the ideal capacitances of different nodes of the power bus under the maximum current consumption of the load circuit.

In some embodiments, by selecting different load circuits, it is also possible to test the ideal capacitances of different nodes of the power bus when the power bus supplies power to the different load circuits.

In some embodiments, the influence of the IR drop on the timing of the load circuit can also be tested through the above-mentioned multiple adjustment operations. Since the influences of the IR drops on the timings of the different load circuits may be different, different preset conditions may be set based on the influences of the IR drops on the timings of the different load circuits.

Embodiments of the present disclosure provide an apparatus for capacitor demand evaluation in the PDN. Each of multiple nodes on the power bus of the PDN is connected to multiple capacitors connected in parallel. Each of the multiple capacitors is provided with a respective one of control switches. Equivalent capacitance of the multiple capacitors connected to each of the multiple nodes can be adjusted for several times through the control switches. For each of different nodes on the power bus, an ideal capacitance of the node can be determined according to the IR drops of the power bus and running speeds of the load circuit detected through the multiple adjustment operations. Embodiments of the present disclosure can accurately evaluate ideal capacitances and positions of capacitors needed on the various power buses in the PDN, thereby effectively reducing the IR drop of the power buses and guaranteeing the running speed of the load circuit.

It should be noted that for the specific implementation contents of the test circuit 401 and the evaluation circuit 402 in the embodiment of the present disclosure, the relevant contents of the embodiments illustrated in FIG. 2 and FIG. 3 can be referred to, which will not be described herein.

Furthermore, based on the contents described in the above embodiments, embodiments of the present disclosure also provide an electronic device that includes at least one processor and a memory. The memory stores computer executable instructions. The at least one process is configured to execute the computer executable instructions stored by the memory to perform various steps of the method for capacitor demand evaluation in a PDN described in the above embodiments, which will not be described herein.

Figure 5:
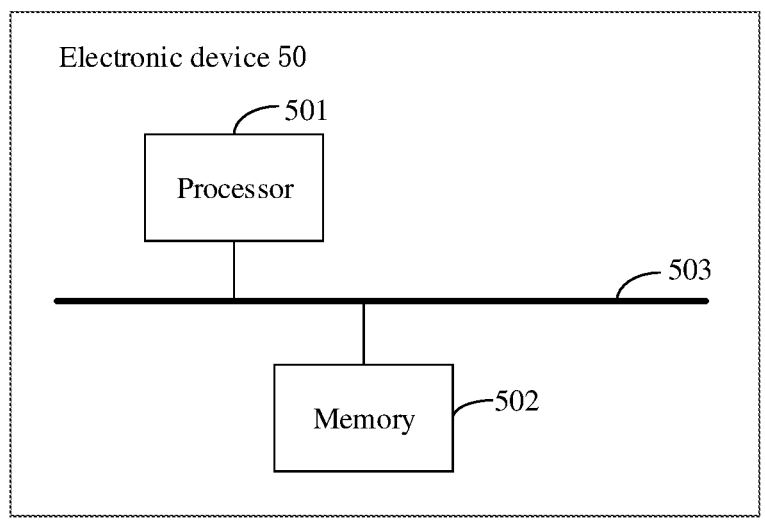
FIG. 5 is a diagram of a hardware structure of an electronic device according to an embodiment of the present disclosure.

In order to better understand the embodiments of the present disclosure, reference can be made to FIG. 5, which is a diagram of hardware structure of an electronic device according to an embodiment of the present disclosure.

As illustrated in FIG. 5 the electronic device 50 of the present embodiment includes a processor 501 and a memory 502.

The memory 502 is configured to store computer executable instructions.

The processor 501 is configured to execute the computer executable instructions stored by the memory to perform various steps of the method for capacitor demand evaluation in a PDN described in the above embodiments. Details can be obtained from relevant description in the embodiments of the method for capacitor demand evaluation in a PDN.

Optionally, the memory 502 may be either independent or integrated with the processor 501.

The electronic device may also include a bus 503 for connecting the memory 502 and the processor 501 when the memory 502 is provided independently.

In several embodiments provided in the present disclosure it should be understood that the disclosed apparatuses and methods may be implemented in other ways. The device embodiments described above are merely illustrative. For example, the partition of module is merely a logical functional partition, and there may be other partition methods in actual implementation. For another example, multiple modules may be combined or integrated into another system, or some features may be ignored or not executed. Furthermore, the mutual coupling or direct coupling or communication connection illustrated or discussed may be through some communication interfaces, and indirect coupling or communication connection of devices or modules can be electrical, mechanical or of other forms.

The modules described as separate parts may or may not be physically separate. The parts shown as modules may or may not be physical elements. In other words, the parts may be located in one place, or may be distributed over multiple network elements. Part or all of the modules may be selected according to actual requirements to achieve the purpose of solutions of the embodiments.

In addition, the functional modules in the various embodiments of the present disclosure may be integrated into one processing unit. Alternatively, each functional module may exist separately, or two or more functional modules may be integrated into one unit. The unit integrated by modules can be realized either in the form of hardware or in the form of hardware plus software functional units.

The integrated module implemented in the form of software function modules can be stored in a computer-readable storage medium. The software function modules can be stored in a storage medium and include several instructions to enable a computer device (e.g. a personal computer, a server, a network device, etc.) or a processor to perform part of the steps of the methods described in various embodiments of the present disclosure.

It should be understood that the processor may be a Central Processing Unit (CPU), a general purpose processor, a Digital Signal Processor (DSP), an Application Specific Integrated Circuit (ASIC), and the like. The general purpose processor can be a microprocessor or any conventional processor, or the like. Steps of methods in the embodiments of the present disclosure can be implemented by hardware processor or by the combination of hardware and software modules in the processor.

The memory may include a high-speed Random Access Memory (RAM), a Non-volatile Memory (NVM) (e.g. at least one disk memory), an U disk, a portable hard drive, a Read-Only Memory (ROM), a magnetic disk or a light disk, etc.

The bus can be an Industry Standard Architecture (ISA) bus, a Peripheral Component (PCI) bus, an Extended Industry Standard Architecture (EISA) bus, and the like. The bus can be divided into address bus, data bus, control bus, etc. For ease of representation, the bus in the drawings of the present disclosure is not limited to only one bus or one type of bus.

The storage medium may be implemented by any type of volatile or non-volatile storage device or a combination thereof, such as Static Random-Access Memory (SRAM), Electrically Erasable Programmable Read-Only Memory (EPROM), Erasable Programmable Read-Only Memory (EPROM), Programmable Read-Only Memory (PROM), Read-Only Memory (ROM), magnetic memory, flash memory, magnetic disk or optical disk. The storage medium can be any available medium that can be accessed by a general-purpose or special-purpose computer.

An exemplary storage medium is coupled to a processor to enable the processor to read information from and write information to the storage medium. Of course, the storage medium can also be an integral part of the processor. The processor and the storage medium may be located in Application Specific Integrated Circuits (ASIC). Of course, the processor and the storage medium can also exist as separate components in the electronic device or the master device.

Those of ordinary skill in the art will appreciate that all or part of the steps to implement the above-described method embodiments may be accomplished by program instruction related hardware. The program can be stored in a computer-readable storage medium. When the program is executed, the steps including the above method embodiments are implemented. The aforementioned storage media can be various media capable of storing program codes such as ROM, RAM, magnetic disk or light disk.

Finally, it should be noted that the above embodiments are merely used to illustrate the technical scheme of the present disclosure, but not to limit it. Although the disclosure is described in detail with reference to the foregoing embodiments, those skilled in the art should understand that the technical schemes described in the foregoing embodiments can still be modified or some or all of the technical features thereof can be equivalently replaced. These modifications or substitutions are not intended to make the essence of the corresponding technical schemes separate from the scope of the technical schemes of the embodiments of the present disclosure.

The invention claimed is:

1. A method for capacitor demand evaluation in a Power Distribution Network (PDN), the PDN comprising at least one power bus provided with a plurality of nodes, the plurality of nodes being distributed at different positions of the power bus, each of the plurality of nodes being connected to a plurality of capacitors connected in parallel, each of the plurality of capacitors being provided with a respective one of control switches, the power bus being used for supplying power to a load circuit, the method comprising:
performing a plurality of adjustment operations;
upon accomplishment of each of the plurality of adjustment operations, detecting a respective IR drop of the power bus and a respective running speed of the load circuit, wherein each of the plurality of adjustment operations is used for adjusting a conducting state of at least one of capacitors connected to at least one of the plurality of nodes through the control switches, to adjust an equivalent capacitance of the plurality of capacitors connected to the at least one of the plurality of nodes; and for each of different nodes on the power bus, determining an ideal capacitance of the node according to the IR drops of the power bus and running speeds of the load circuit detected through the multiple adjustment operations.

2. The method of claim 1, wherein performing the plurality of adjustment operations comprises:
determining a plurality of first adjustment schemes, wherein at least one of the nodes has different target capacitances among different ones of the first adjustment schemes;
traversing the plurality of first adjustment schemes;
for each of the plurality of first adjustment schemes being traversed,
determining a target node to be adjusted and a target capacitance of the target node; and
adjusting control switches of capacitors connected to the target node to make an equivalent capacitance of the capacitors connected to the target node to be equal to the target capacitance.

3. The method of claim 1, wherein performing the plurality of adjustment operations comprises:
adjusting, according to a second adjustment scheme, conducting states of the capacitors connected to the at least one of the plurality of nodes;
updating the second adjustment scheme according to an IR drop of the power bus and a running speed of the load circuit detected through the second adjustment scheme; and
adjusting, according to the updated second adjustment scheme, the conducting states of the capacitors connected to the at least one of the plurality of nodes until the IR drop of the power bus and the running speed of the load circuit satisfy a preset condition.

4. The method of claim 2, wherein the capacitors connected to the target node comprise a first capacitor, and a capacitance of the first capacitor is the target capacitance;
wherein adjusting the control switches of the capacitors connected to the target node to make the equivalent capacitance of the capacitors connected to the target node to be equal to the target capacitance comprises:
adjusting a control switch of the first capacitor to be in a closed state; and
adjusting control switches of capacitors, other than the first capacitor, connected to the target node to be in an open state.

5. The method of claim 2, wherein the capacitors connected to the target node comprise at least two first capacitors, and a total capacitance of the at least two first capacitors is the target capacitance,
wherein adjusting the control switches of the capacitors connected to the target node to make the equivalent capacitance of the capacitors connected to the target node to be equal to the target capacitance comprises:
adjusting control switches of the at least two capacitors to be in a closed state; and
adjusting control switches of capacitors, other than the at least two capacitors, connected to the target node to be in an open state.

6. The method of claim 1, wherein for each of different nodes on the power bus, determining the ideal capacitance of the node according to the IR drops of the power bus and running speeds of the load circuit detected through the multiple adjustment operations comprises:
determining a minimum equivalent capacitance of the node when each of the IR drop of the power bus and the running speed of the load circuit is within a respective preset range; and
taking the minimum equivalent capacitance of the node as the ideal capacitance of the node.

7. The method of claim 1, wherein the load circuit comprises any one of:
a data signal input and output control circuit, a clock signal input control circuit, a chip select signal input control circuit, a command and address signal input control circuit, a row address strobe signal control circuit or a column address strobe signal control circuit.

8. An apparatus for capacitor demand evaluation in a Power Distribution Network (PDN), the PDN comprising at least one power bus provided with a plurality of nodes, the plurality of nodes being distributed at different positions of the power bus, each of the plurality of nodes being connected to a plurality of capacitors parallel to each other, each of the plurality of capacitors being provided with a respective one of control switches, the power bus being used for supplying power to a load circuit, the apparatus comprising:
a test circuit, configured to perform a plurality of adjustment operations and detect a respective IR drop of the power bus and a respective running speed of the load circuit upon accomplishment of each of the plurality of adjustment operations, wherein each of the plurality of adjustment operations is used for adjusting a conducting state of at least one of capacitors connected to at least one of the plurality of nodes through the control switches to adjust an equivalent capacitance of the plurality of capacitors connected to the at least one of the plurality of nodes; and
an evaluation circuit, configured to, for each of different nodes on the power bus, determine an ideal capacitance of the node according to the IR drops of the power bus and running speeds of the load circuit detected through the multiple adjustment operations.

9. The apparatus of claim 8, wherein the test circuit is configured to:
determine a plurality of first adjustment schemes, wherein at least one of the nodes has different target capacitances among different ones of the first adjustment schemes;
traverse the plurality of first adjustment schemes;
for each of the plurality of first adjustment schemes being traversed,
determine a target node to be adjusted and a target capacitance of the target node; and
adjust control switches of capacitors connected to the target node to make an equivalent capacitance of the capacitors connected to the target node to be equal to the target capacitance.

10. The apparatus of claim 8, wherein the test circuit is configured to:
adjust, according to a second adjustment scheme, conducting states of the capacitors connected to the at least one of the plurality of nodes;
update the second adjustment scheme according to an IR drop of the power bus and a running speed of the load circuit detected through the second adjustment scheme; and
adjust, according to the updated second adjustment, the conducting states of the capacitors connected to the at least one of the plurality of nodes until the IR drop of the power bus and the running speed of the load circuit satisfy a preset condition.

11. The apparatus of claim 9, wherein the capacitors connected to the target node comprise a first capacitor, and a capacitance of the first capacitor is the target capacitance;
  wherein the test circuit is configured to:
    adjust a control switch of the first capacitor to be in a closed state; and
    adjust control switches of capacitors, other than the first capacitor, connected to the target node to be in an open state.

12. The apparatus of claim 9, wherein the capacitors connected to the target node comprise at least two first capacitors, and a total capacitance of the at least two first capacitors is the target capacitance,
  wherein the test circuit is configured to:
    adjust control switches of the at least two capacitors to be in a closed state; and
    adjust control switches of capacitors, other than the at least two capacitors, connected to the target node to be in an open state.

13. The apparatus of claim 8, wherein the evaluation circuit is configured to:
  for each of the plurality of nodes of the power bus,
    determine a minimum equivalent capacitance of the node when each of the IR drop of the power bus and the running speed of the load circuit is within a respective preset range; and
    take the minimum equivalent capacitance of the node as the ideal capacitance of the node.

14. The apparatus of claim 8, wherein the load circuit comprises any one of:
  a data signal input and output control circuit, a clock signal input control circuit, a chip select signal input control circuit, a command and address signal input control circuit, a row address strobe signal control circuit or a column address strobe signal control circuit.

15. An electronic device comprising at least one processor and a memory,
  wherein the memory stores computer executable instructions; and
  the at least one process is configured to execute the computer executable instructions to perform a method for capacitor demand evaluation in a Power Distribution Network (PDN), the PDN comprising at least one power bus provided with a plurality of nodes, the plurality of nodes being distributed at different positions of the power bus, each of the plurality of nodes being connected to a plurality of capacitors connected in parallel, each of the plurality of capacitors being provided with a respective one of control switches, the power bus being used for supplying power to a load circuit, the method comprising:
  performing a plurality of adjustment operations;
  upon accomplishment of each of the plurality of adjustment operations, detecting a respective IR drop of the power bus and a respective running speed of the load circuit, wherein each of the plurality of adjustment operations is used for adjusting a conducting state of at least one of capacitors connected to at least one of the plurality of nodes through the control switches, to adjust an equivalent capacitance of the plurality of capacitors connected to the at least one of the plurality of nodes; and
  for each of different nodes on the power bus, determining an ideal capacitance of the node according to the IR drops of the power bus and running speeds of the load circuit detected through the multiple adjustment operations.

16. The electronic device of claim 15, wherein performing the plurality of adjustment operations comprises:
  determining a plurality of first adjustment schemes, wherein at least one of the nodes has different target capacitances among different ones of the first adjustment schemes;
  traversing the plurality of first adjustment schemes;
  for each of the plurality of first adjustment schemes being traversed,
    determining a target node to be adjusted and a target capacitance of the target node; and
    adjusting control switches of capacitors connected to the target node to make an equivalent capacitance of the capacitors connected to the target node to be equal to the target capacitance.

17. The electronic device of claim 15, wherein performing the plurality of adjustment operations comprises:
  adjusting, according to a second adjustment scheme, conducting states of the capacitors connected to the at least one of the plurality of nodes;
  updating the second adjustment scheme according to an IR drop of the power bus and a running speed of the load circuit detected through the second adjustment scheme; and
  adjusting, according to the updated second adjustment scheme, the conducting states of the capacitors connected to the at least one of the plurality of nodes until the IR drop of the power bus and the running speed of the load circuit satisfy a preset condition.

18. The electronic device of claim 16, wherein the capacitors connected to the target node comprise a first capacitor, and a capacitance of the first capacitor is the target capacitance;
  wherein adjusting the control switches of the capacitors connected to the target node to make the equivalent capacitance of the capacitors connected to the target node to be equal to the target capacitance comprises:
    adjusting a control switch of the first capacitor to be in a closed state; and
    adjusting control switches of capacitors, other than the first capacitor, connected to the target node to be in an open state.

19. The electronic device of claim 16, wherein the capacitors connected to the target node comprise at least two first capacitors, and a total capacitance of the at least two first capacitors is the target capacitance,
  wherein adjusting the control switches of the capacitors connected to the target node to make the equivalent capacitance of the capacitors connected to the target node to be equal to the target capacitance comprises:
    adjusting control switches of the at least two capacitors to be in a closed state; and
    adjusting control switches of capacitors, other than the at least two capacitors, connected to the target node to be in an open state.

20. The electronic device of claim 15, wherein for each of different nodes on the power bus, determining the ideal capacitance of the node according to the IR drops of the power bus and running speeds of the load circuit detected through the multiple adjustment operations comprises:
  determining a minimum equivalent capacitance of the node when each of the IR drop of the power bus and the running speed of the load circuit is within a respective preset range; and taking the minimum equivalent capacitance of the node as the ideal capacitance of the node.

* * * * *